United States Patent [19]

Razzano

[11] 3,853,932

[45] Dec. 10, 1974

[54] PROCESS FOR PRODUCING SILANOL END-STOPPED POLYMERS OF LOW MOLECULAR WEIGHT

[75] Inventor: John S. Razzano, Troy, N.Y.

[73] Assignee: General Electric Company, Waterford, N.Y.

[22] Filed: Dec. 28, 1973

[21] Appl. No.: 429,380

[52] U.S. Cl.................... 260/448.2 E, 260/448.8 R
[51] Int. Cl. ............................................ C07f 7/08
[58] Field of Search .. 260/448.2 E, 448.8 R, 46.5 R

[56] References Cited
UNITED STATES PATENTS

| | | | |
|---|---|---|---|
| 3,607,899 | 9/1971 | Brown et al.................. | 260/448.2 E |
| 3,714,213 | 1/1973 | Miller et al................... | 260/448.2 E |
| 3,803,195 | 4/1974 | Nitzsche et al............... | 260/448.2 E |

*Primary Examiner*—Daniel E. Wyman
*Assistant Examiner*—Paul F. Shaver
*Attorney, Agent, or Firm*—Donald J. Voss, Esq.; E. Philip Koltos, Esq.; Frank L. Neuhauser, Esq.

[57] ABSTRACT

A process for producing low molecular weight silanol end-stopped diorganopolysiloxane polymers comprising contacting a cyclic diorganotrisiloxane with an acid-activated hydroaluminum silicate clay which is preferably a sulfuric acid-activated montomorillonite clay in the presence of water and a polar organic solvent and separating the desired product. The cyclic-trisiloxane, water and a polar solvent are preferably present in a uniform homogeneous phase at the time the acid-activated hydroaluminum silicate clay catalyst is introduced into the system for producing the silanol end-stopped diorganopolysiloxane polymers containing an average of three to 10 diorganosiloxy units.

10 Claims, No Drawings

PROCESS FOR PRODUCING SILANOL END-STOPPED POLYMERS OF LOW MOLECULAR WEIGHT

BACKGROUND OF THE INVENTION

The present invention relates to the production of low molecular weight silanol end-stopped diorganopolysiloxanes and more particularly the present invention relates to the production of low molecular weight silanol end-stopped diorganopolysiloxanes from cyclic trisiloxanes with the use of an acid-activated hydroaluminum silicate clay as a cataylst.

Low molecular weight silanol-stopped diorganopolysiloxanes having an average number of anywhere from three to 10 diorganosiloxy units have many uses including as intermediates for the production of high molecular weight polymers, as additives for the preparation of heat vulcanizable silicone rubber compositions and room temperature vulcanizable silicone rubber compositions and also as additives for the preparation of organic rubbers. In particular, such low molecular weight silanol-stopped diorganopolysiloxanes have found wide use as process aids. This is a term which is used in silicone technology. Such process aids are utilized as additives to both fumed silica and precipitated silica fillers that are added to mix with the diorganopolysiloxane gum in the preparation of heat vulcanizable silicone rubber compositions. Such silanol-stopped materials are added with the filler and gum as the filler is incorporated or mixed into the high molecular weight diorganopolysiloxane gum so as to facilitate the mixing of the dry powdery filler into the viscous high molecular weight diorganopolysiloxane gum which can have a viscosity of anywhere from 1,000,000 to 200,000,000 centipoise at 25°C. Silica fillers are incorporated into the heat vulcanizable silicone rubber compositions as is known are comprised of small particles of silica $SiO_2$ which have a certain amount of silanol groups and which may be treated or untreated with different materials such as, silazanes and cyclic polysiloxanes and which fillers are incorporated into heat vulcanizable silicone rubber compositions and also room temperature vulcanizable silicone rubber compositions for the purpose of enhancing the tensile strength of the resulting cured silicone rubber elastomer. The silanol end-stopped diorganopolysiloxanes also have other effects such as the improvements of the final properties of the heat vulcanizable silicone rubber composition in the cured elastomer form and also the improvement of the properties of the heat vulcanizable silicone rubber composition after it has been prepared but prior to cure since the silanol-stopped diorganopolysiloxanes prevent the heat vulcanizable rubber composition in the uncured state from excessive hardening upon storage.

Another important use of the low molecular weight silanol-stopped diorganopolysiloxanes of the present case is that they may be used as intermediates and condensed so as to form high molecular weight polymers such as, fluorosilicon polymers of high molecular weight in a controlled manner, that is, in a manner in which the end viscosity of the polymer is precisely controlled, which fluorosilicon-containing polymers can be, of course, utilized to prepare fluorosilicon solvent resistant silicone elastomers.

In the past, one method for producing such silanol-stopped diorganopolysiloxanes of low molecular weight was to take diorganodichlorosilanes of 99 percent purity or so and hydrolyze them in water in the presence of large amounts of polar solvent. while such diorganodichlorosilanes were added to the water polar solvent mixture there was continuously present or added at the time of addition of the diorganodichlorosilanes large amounts of sodium bicarbonate so as to maintain the hydrolysis solution neutral. Both the sodium bicarbonate and the excess amounts of polar solvent were necessary so as to prepare the low molecular weight silanol-stopped diorganopolysiloxanes. If enough polar solvent was not utilized or if enough sodium bicarbonate was not added so that the solution was too acidic, the silanol groups of the silanol-stopped diorganopolysiloxanes that would be formed would condense with each other forming high molecular weight silanol-stopped diorganopolysiloxanes which were not particularly desirable for the purposes set forth herein before.

With this type of process it was possible to obtain a 60 percent yield of the desired silanol-stopped low molecular weight diorganopolysiloxanes as compared to that theoretically available from the diorganodichlorosilanes that were hydrolyzed. As an example of the large volumes of material that was utilized in the process, that is, in one instance for 8,000 pounds of products of the low molecular weight silanol-stopped diorganopolysiloxane formed, there was utilized 115,000 pounds of ingredients. After the hydrolysis was completed in the above process, the water layer would be separated from the polar layer, most of the salts being located in the water layer, and then the polar solvent would be stripped from the polar layer leaving behind the desired low molecular weight silanol-stopped diorganopolysiloxanes.

This process was undesirable for various reasons, one of which was the large amounts of acetone and water that have to be used in the process as well as the large amount of buffering agents that had to be added to the hydrolysis mixture, thus necessitating very large equipment space. In addition, the salted water phase that was formed after the hydrolysis had to be purified before it could be disposed of. Further, the yield was not all that could be desired since after the hydrolysis when the water layer was separated from the polar solvent layer some of the desired end product was lost in the water layer. Accordingly, it was desired to improve on this process.

As is well known in the production of silicone intermediates and particularly in the production of high molecular weight linear diorganopolysiloxane polymers of 1,000,000 to 200,000,000 centipoise at 25°C, that are used in the production of heat vulcanizable silicone rubber compositions that such polymers are in some cases prepared from cyclic polysiloxanes. The most advantageous high viscosity polymer or gum that is obtained from such cyclicpolysiloxanes is obtained from the cyclic tetrasiloxanes. Such cyclic tetrasiloxanes are obtained by hydrolyzing diorganodichlorosilanes with water and then cracking the hydrolyzate with KOH or another alkaline metal hydroxide at elevated temperatures so as to distill overhead cyclic polysiloxanes. Utilizing this method, a large amount of the desired cyclic tetrasiloxanes are obtained. However, there are also obtained other cyclicsiloxanes and more specifically, the cyclic trisiloxane which heretofore has not found wide use as an intermediate for the production of high molecular weight linear diorganopolysiloxane polymers. Accordingly, it is desirable to use cyclic trisiloxanes in the production of low molecular weight silanol-stopped diorganopolysiloxanes.

One means accomplishing the purpose is disclosed in Omietanski, U.S. Pat. No. 3,309,390. Omietanski discloses the production of low molecular weight silanol-stopped diorganopolysiloxanes from cyclic trisiloxanes through the use of an ion exchange resin. A disadvantage with the Omietanski process is that it uses an ion exchange resin. Such ion exchange resins are unduly expensive, as such they cannot be thrown away after they have spent themselves and time and effort must be made to regenerate them which additional time and chemicals that are used to regenerate the ion exchange resin, of course, adds to the expense of the process. In addition, such ion exchange resins may have a certain amount of residual acidity on the resin which has to be washed off the ion exchange resin before it can be utilized in the Omietanski process, otherwise, the low molecular weight silanol-stopped diorganopolysiloxanes that are formed from the process may contain an excessive amount of acidity which will result in the condensation of the silanol groups of the desired product.

It has also been found that acid-activated carbon black will not operate in such a process, that is, acid-activated carbon black when it is catalyzed in the process of reacting cyclic trisiloxanes only high molecular weight silanol chain-stopped diorganopolysiloxanes result from the process for some reason. The desired low molecular weight diorganopolysiloxanes are not obtained.

Accordingly, it is one object of the present invention to provide inexpensive and efficient catalyst for the production of low molecular weight silanol-stopped diorganopolysiloxanes from cyclic trisiloxanes.

It is an additional object of the present invention to provide a process for producing low molecular weight silanol-stopped diorganopolysiloxanes from cyclic trisiloxanes without the use of large amounts of water and polar solvents.

It is an additional object of the present invention to provide a process for producing low molecular weight silanol-stopped diorganopolysiloxanes from cyclic trisiloxanes so as to obtain such low molecular weight silanol-stopped diorganopolysiloxanes in high yield.

It is an additional object of the present invention to provide a process for producing low molecular weight silanol-stopped diorganopolysiloxanes which can be used as intermediates to produce high molecular weight fluorosilicon polymers.

These and other objects of the present invention are accomplished by means of the disclosure set forth below.

SUMMARY OF THE INVENTION

A process for producing low molecular weight silanol end-stopped diorganopolysiloxanes containing an average of three to 10 diorganosiloxy units and more preferably three to six diorganosiloxy units comprising contacting a cyclic trimer of the formula, $(R_2SiO)_3$ where R is selected from the class consisting of alkyl radicals, haloakyl radicals, and cycloalkyl radicals of one to eight carbon atoms, vinyl radicals and phenyl radicals and mixtures thereof with an acid-activated hydroaluminum silicate clay in the presence of water and a polar solvent and separating the desired product after the hydrolysis.

To obtain the highest efficiency from the present process, it is preferred that the cyclic trisiloxane, the water and the polar solvent be present in a uniform homogeneous phase. If there is a uniform homogeneous phase then there will be obtained a higher yield of the desired product. If there is not a homogeneous phase, then the yield will be drastically reduced and/or the reaction time will be drastically extended.

Although most any polar solvent may be utilized the preferred polar solvents are acetone, dioxane, tetrahydrofuran, that is, polar solvents having a boiling point of anywhere from 50° to 80°C.

The acid-activated hydroaluminum silicate clay ia preferably one of the acid-activated montomorillonite clays which may be activated either with sulfuric acid or hydrochloric acid. Such clays are manufactured and sold by Filtrol Corporation, Los Angeles, California under the tradename "Filtrol."

Generally, in the first step of the process, that is, the process of contacting the homogeneous phase of water, cyclic trisiloxane and polar solvent with the acid-activated hydroaluminum silicate clay, it is preferred that there be utilized 0.1 to 10 parts of the acid-activated hydroaluminum silicate clay per 100 parts of the trisiloxane, 0.5 to 10 parts of the polar solvent per part of the cyclic trisiloxane and 0.25 to 1 part of water per part of the cyclic trisiloxane. Although, other amounts above the maximum amounts indicated above may be used, they form no useful purpose and require the utilization of excess equipment. Preferably, the reaction is carried out in the temperature range of 50° to 80°C for a period of 2 to 12 hours.

It should be noted that the cyclic trisiloxane may be any cyclic trisiloxane where R may be selected from lower alkyl radicals of one to eight carbon atoms, cycloalkyl radicals of one to eight carbon atoms, vinyl radicals and phenyl radicals. It must be important to note also, in addition, that R can be selected from haloaklyl radicals and specifically fluoroalkyl radicals, for instance, radicals of the formula $R'CH_2CH_2$, where $R'$ is a perfluoroalkyl radical. It is, of course, obvious that the R's in the cyclic trisiloxane need not be the same and may be selected from a mixture of the above exemplary radicals, for instance, in the diorganosiloxy units in the cyclic trisiloxanes, the R radical may be in some cases methyl while in some cases it may be vinyl or perfluoroalkyl or other types of alkyl or cycloalkyl for that matter.

DESCRIPTION OF THE PREFERRED EMBODIMENT

The R radical in the cyclic trisiloxanes that are utilized in the process of the present invention are selected from the class consisting of monovalent hydrocarbon radicals and halogenated monovalent hydrocarbon radicals. Preferably, the R radical in the cyclic trisiloxanes is selected from the alkyl radicals of one to eight carbon atoms, haloalkyl radicals of one to eight carbon atoms and cycloalkyl radicals of one to eight carbon atoms, such radicals being methyl, ethyl, propyl, butyl, monochloromethyl, monochloroethyl, monochloropropyl, monofluoromethyl, difluoroethyl, trifluoropropyl and cycloheptyl. In the specific embodiment of the present invention in the cyclic trisiloxane, preferably R is selected from alkyl radicals of one to eight carbon atoms and $R'CH_2CH_2$ radicals and mixtures thereof, where R; is a perfluoroalkyl radical. In the cyclic trisiloxanes, R may also be selected from alkenyl radicals such as, vinyl and allyl radicals and most preferably vinyl radicals and mononuclear aryl radicals such as, phenyl radicals. Preferably, the R radicals in the cyclic trisiloxanes are selected preferably from alkyl radicals of one to eight carbon atoms and vinyl, phenyl, fluorinated alkyl radicals of one to eight carbon atoms and mixtures of such radicals.

To obtain the starting cyclic trisiloxane for use in the process of the present invention, there is first taken a diorganodihalogensilane of the formula $R_2SiX_2$, where R is as previously defined and X is halogen and preferably chlorine. Preferably, such a diorganodihalogensilane is of at least 99 percent purity with the other 1 percent composed of monofunctional and trifunctional silane units. In the usual process of producing such cyclic trisiloxanes that are utilized in the process of the present invention, the diorganodihalogensilane is taken and added to water at approximately room temperature and preferably is slowly added to water so as to maintain the temperature of the water hydrolysis mixture at room temperature or below, so that the low boiling silanes will not be given off and be lost in the hydrolysis. If the temperature of the hydrolysis mixture rises above room temperature, then it is preferred to have condensation equipment on the hydrolysis kettle so as to return to the hydrolysis mixture any low boiling silanes that may be stripped off.

In such a hydrolysis there will be formed in addition to the diols a certain amount of cyclic siloxanes which will comprise a mixture of cyclic trisiloxanes, cyclic tetrasiloxanes, cyclic pentasiloxanes all the way up to cyclic siloxanes that have 10 siloxy groups in the cyclic ring.

To purify and also maximize the yield of cyclic trisiloxanes, it is traditional to separate the siloxy hydrolyzate that is formed in the above hydrolysis mixture from the water to add to the siloxy hydrolysis mixture an organic water-immiscible solvent such as, a high boiling hydrocarbon oil, e.g., Bayol 90, so as to dissolve the siloxy hydrolyzate in the solvent, and then to heat the resulting mixture at an elevated temperature and preferably at 150° to 200° C for a period of 1 to 5 hours at reduced pressure, that is, at a pressure of 10 millimeters of mercury to 150 millimeters of mercury. It is also necessary to also add a catalyst which is preferably an alkali metal hydroxide such as, sodium hydroxide or potassium hydroxide at a concentration of anywhere from 1,000 parts per million to 1 percent of the alkali metal hydroxide based on the siloxy hydrolyzate mixture that is utilized in this step. By preferentially distilling overhead cyclic trisiloxanes, that is, by selecting the proper pressure and temperature within the above ranges given, it is possible to obtain the cyclic trisiloxanes as an overhead distillate in the above heating procedure or cracking procedure at a yield of 96 percent based on the total siloxy hydrolyzate mixture. With this procedure, the cyclic trisiloxane is obtained at about 99 percent purity, which purity must be present for the next step of the process of the present invention.

Once the cyclic trisiloxane is obtained by the above process which is well known in the art or is obtained by any process for that matter, then the cyclic trisiloxane may be subjected to the process of the present invention. The cyclic trisiloxane is taken and per one part of the cyclic trisiloxane there is added to it from 0.5 to 10 parts of a polar solvent and from 0.05 to 1 part of water, and preferably there is added per one part of the cyclic trisiloxane from 1 part to 5 parts of polar solvent and preferably 0.1 to 0.5 parts of water per part of the cyclic trisiloxane. The polar solvent may be any polar solvent that has a boiling point in the temperature range of 50° to 80° C, but is preferably selected from tetrahydrofuran, dioxane and acetone and is more preferably acetone. The reason for having the polar solvent reflux at the above temperature of 50° to 80° C is that the process is most efficient at that temperature. It is desirable to maintain the process of the present invention in which the cyclic trisiloxane is converted to the corresponding diol within the above temprature range of 50° to 80° C and preferably 60°–70° C, since if the process if carried out at a lower temperature than 50° C then the process will not be as efficient as desired and if it is carried out at a temperature range above 80° C, then the high temperatures will cause the condensation of the silanol groups in the diols that are formed by the process to result in high molecular weight silanol-stopped diorganopolysiloxanes which are undesirable products in the process of the present invention.

It must be remembered that with the process of the present invention, it is desired to convert cyclic trisiloxanes into low molecular weight silanol-terminated diorganopolysiloxanes having an average of anywhere from three to 10 diorganosiloxy units and more preferably having an average number of diorganosiloxy units of anywhere from three to six. This is the most desirable molecular weight or chain length of the product desired when it is to be utilized as a process aid for heat vulcanizable silicone rubber compositions or when it is to be utilized to produce high molecular weight linear diorganopolysiloxane polymers useful as base polymers for the preparation of heat vulcanizable silicone rubber compositions as well as room temperature vulcanizable silicone rubber compositions.

For maximum efficiency of the process of the present invention, it is important that when the cyclic trisiloxane, polar solvent and water come in contact with a catalyst that converts the cyclic trisiloxane to the corresponding diol that the three materials be present in a uniform homogeneous phase. If a uniform homogeneous phase is not present then the process will suffer in efficiency and a high yield of the diol, that is, the low molecular weight silanol end-stopped diorganopolysiloxane will not be formed from the cyclic trisiloxane. Accordingly, in order to obtain as high yield as possible of the desired diol from the cyclic trisiloxane and to lower the process time and have a process of maximum efficiency, it is necessary but not critical that the cyclic trisiloxane, polar solvent and water be present in a uniform homogeneous phase. It can be appreciated that the process can take place with some yield of the desired diol in a heterogeneous phase mixture.

The catalyst that is utilized to convert the cyclic trisiloxane to the corresponding low molecular weight silanol-terminated diorganopolysiloxane having an average of anywhere from three to 10 diorganosiloxy units and more preferably three to six diorganosiloxy units, is preferably an acid-activated hydroaluminum silicate clay which may be either hydrochloric or sulfuric acid-activated hydroaluminum silicate clay. Such a preferred class of clays are the montomorillonite class of clays which may be activated with either sulfuric or hydrochloric acid. The preferred acid-activated clays which are the montomorillonite class of clays are, for example, the acid-activated clays sold under the tradename Filtrol, manufactured by the Filtrol Corporation of Los Angeles, California, which is a particular type of acid-activated montomorillonite. The advantages of Filtrol and the other acid-activated montomorillonite class of clays is their low cost as compared to ion exchange resins and that they do not impart any acidity to the reactants or to the reaction product. At most, such acid-activated montomorillonite class of catalysts impart anywhere from 0 to less than 1 part per million of acidity to the reaction product of the present invention which amount of acidity is acceptable.

This acid-activated montomorillonite class of catalysts is preferably sulfuric acid-activated montomorillonite class of clay catalysts since they are the most easily available in the United States and are the most inexpensive type of such acid-activated clay in the United States, as well as being the most efficient catalyst in the process of the present invention. Such acid-activated montomorillonite clays are utilized in the process of the present invention generally at a concentration of 0.1 to 10 parts per 100 parts of the cyclic trisiloxane reactant and more preferably at a concentration of 1 to 5 parts per 100 parts of the cyclic trisiloxane. As can be appreciated, less than 0.1 parts of the acid-activated montomorillonite clay class of catalysts will lower the efficiency of the process of the present invention. As can also be appreciated, more than 10 parts of the catalyst may be used per 100 parts of the cyclic trisiloxane with no advantage. The only disadvantage of utilizing more than 10 parts of the acid-activated montomorillonite clay class of catalysts in the process of the present invention is that it will increase the expense of the process. Generally, the uniform homogeneous phase of the cyclic trisiloxane polar solvent and water is brought into contact with the catalyst for anywhere from 2 to 12 hours to obtain the desired yield of low molecular weight silanol end-stopped diorganopolysiloxane and more preferably the contact time may be anywhere from 4 to 8 hours. As can be envisioned, less than 2 hours contact time will not produce the desired yield while more than 12 hours contact time is in most cases unnecessary.

Accordingly, utilizing the reactants set forth above as well as the catalyst and contact time specified above, there is obtained a reaction product which contains 70–95 percent by weight of the desired low molecular weight silanol-stopped diorganopolysiloxanes having an average of anywhere from three to 10 diorganosiloxy units and more preferably having an average number of three to six diorganosiloxy units.

With the process of the present invention, 70 to 95 percent of the cyclic trisiloxane is converted to the desired low molecular weight silanol end-stopped diorganopolysiloxane.

At this point, various procedures may be utilized to obtain in high purity the desired low molecular weight silanol end-stopped diorganopolysiloxane. As can be appreciated, the product from the process of the present invention comprises a mixture of the desired low molecular weight silanol end-stopped diorganopolysiloxanes having an average number of anywhere from three to 10 diorganosiloxy units, acetone, water, low boiling cyclicsiloxanes and the acid-activated clay catalyst.

Accordingly, in one procedure there is added from 0.1 to 5 parts of magnesium oxide, per part of the acid-activated hydroaluminum silicate clay catalyst. The addition of magnesium oxide effectively deactivates the acid-activated clay catalyst for the next step in the purification procedure. Thus, after the magnesium oxide is added to the mixture, the mixture is taken to a stripping kettle where all the acetone is stripped off for reuse in the process or in another process which acetone is stripped off at a temperature range of 20° to 60° C and at a pressure of 100 to 200 millimeters of mercury. If the magnesium oxide had not been added previous to this step in the purification procedure, then during this step the acid-activated clay catalyst would cause a further condensation of the silanol groups in the diol product that was formed from the cyclic trisiloxanes so as to form undesirable high molecular weight silanol end-stopped diorganopolysiloxanes.

Then, after the acetone has been stripped off, there is added to the remaining siloxane water mixture from 0.1 to 5 parts of Celite manufactured by Johns-Manville or any other diatomaceous earth filtering aid per part of the acid-activated clay catalyst, which diatomaceous earth is utilized as a filtering aid and then the acid-activated clay and magnesium oxide are filtered out of the siloxane water mixture. The resulting catalyst free siloxane water mixture is then taken and placed in the stripping kettle where all the water and low boiling siloxanes are stripped off at a stripping temperature in the range of 100° to 140° C under 10 to 100 millimeters of mercury vacuum to leave behind in the stripping or distillation kettle the desired low molecular weight silanol-terminated diorganopolysiloxane product generally having an average of anywhere from three to 10 diorganosiloxy units and more preferably having from three to six diorganosiloxy units, which desired end product is obtained, as stated previously, at a 70 to 85 percent yield from the cyclic trisiloxane initial reactant in the process of the present invention. Such low molecular weight silanol-terminated diorganopolysiloxane will also have anywhere from 6 to 15 percent by weight of silanol groups or hydroxy content or more preferably anywhere from 6 to 10 percent by weight of hydroxy content.

In an alternative purification procedure after the reaction of the present process has taken place in which the cyclic trisiloxane has been converted to the desired low molecular weight silanol-terminated diorganopolysiloxane in the presence of the acid-activated clay catalyst, there is added from 0.1 to 5 parts of diatomaceous earth to the siloxane mixture as a filtering aid and the resulting siloxane, water, polar solvent mixture is filtered so as to filter out the acid activated clay catalyst. Then the siloxane water, polar solvent mixture is transferred to a stripping kettle maintained at a temperature of 20° to 60° C under pressure of 100 to 200 millimeters of mercury. All the acetone is stripped off and recycled for use in the process of the present invention or in other processes. Then the siloxane water mixture that is left is then subjected to a temperature in the range of 100° to 140° C at a pressure of 10 to 100 millimeters of mercury so as to strip off all the water and the low boiling siloxanes specifically the cyclic siloxanes and cyclic trisiloxanes that were not converted to the low molecular weight silanol-terminated diorganopolysiloxanes desired product of the present process so as to leave behind at a very high purity the desired end product of the present case. The desired end product of the process of the present invention in its purified form as a low molecular weight silanol-terminated diorganopolysiloxane may be utilized as a processing aid for the mixing of silica filler or other types of filler into high molecular weight linear diorganopolysiloxane polymers or gums having a viscosity of anywhere from 1,000,000 to 200,000,000 centipoise at 25° C, which process aid facilitates the mixing of the filler into the gum and generally improves the properties both in the uncured and cured state of the heat vulcanizable silicone rubber compositions. Such compositions having a linear diorganopolysiloxane polymer or gum of anywhere from 1,000,000 to 200,000,000 centipoise at 25° C which are mixed with fillers, various heat aging additives, pigments are cured at elevated temperatures of anywhere from 130° to 300° C in the presence of various catalysts which are incorporated into the silicone compositions and more preferably such catalyst being peroxide catalysts to form a silicone elastomer whose uses and final properties are well known in the silicone art. An example of such heat vulcanizable silicone rubber compositions to which the present products of the process of the present invention may be utilized as additives or process aids are, for example, to be found in U.S. patent application of George P. DeZuba, Vernon G. Simpson and Frank J. Glaister, Ser. No. 213,727, filed Dec. 29, 1971, entitled "Heat Curable Polysiloxane Compositions Containing Fibers," whose disclosure is hereby incorporated into the present application by reference.

The desired low molecular weight silanol-terminated diorganopolysiloxane products of the process of the present invention also may be utilized or reacted with each other or other silanol-terminated diorganopolysiloxanes so as to form high molecular weight linear diorganopolysiloxanes having a viscosity of anywhere from 2,000 centipoise to 200,000,000 centipoise at 25° C. These polymers may then be used as base polymers for the formation of either room temperature or heat vulcanizable silicone rubber compositions.

The advantage of the formation of high molecular weight linear diorganopolysiloxane polymers from such silanol-terminated low molecular weight diorganopolysiloxanes obtained by the process of the present invention, is that with the preparation of the high molecular weight polymer it is possible to obtain more variety in the hydrocarbon substituent groups in such polymers in a neutralized manner. For instance, such low molecular weight silanolterminated diorganopolysiloxanes which are formed by the process of the present invention can be utilized to form high molecular weight polymers of 1,000,000 to 200,000,000 centipoise at 25° C, wherein the substituent group be selected from various substituent groups given above in the definition of the R radical in the cyclic trisiloxane used in the process of the present invention and more specifically the lower alkyl substituent groups of one to eight carbon atoms and the fluorinated alkyl radicals of one to eight carbon atoms. One example of such fluorinated alkyl radicals being, for example, R'CH$_2$CH$_2$—, where R' stands for perfluoroalkyl radicals. Such high molecular weight polymers may then be utilized to form heat vulcanizable silicone rubber compositions which in the cured state have outstanding physical properties and are also solvent and oil resistant.

The examples below are given for the purpose of illustrating the invention and are not given for the purpose of limiting or specifically defining the invention claimed in the claims of the present case. All parts in the examples are by weight.

EXAMPLE 1

There is taken 500 parts of hexamethylcyclotrisiloxane which was added to a 2 liter flask containing 550 parts of acetone. The cyclic trimer was dissolved in the acetone with agitation followed by the addition of 50 parts of water and 10 parts of Filtrol No. 2 which is sold by Filtrol Corporation, Los Angeles, California. The reaction was brought to reflux at 60° C pot temperature, and the reaction was continued for 6.5 hours with constant agitation. Then 5 parts of magnesium oxide was added to the reaction mixture and stirred for 10 minutes. The pot was cooled to 40° C and vacuum was applied to the flask with an aspirator. Acetone was stripped from the reaction and collected in a cold trap with external heat applied to maintain the 40° C pot temperature. When the acetone was essentially removed from the flask, the vacuum was broken and 10 parts of diatomaceous earth was added. The pot contents were vacuum filtered and the filter cake was washed with 25 cc of acetone. The filtrate was transferred to a clean 1 liter flask and the flask was placed on a rotary evaporator. Aspirator vacuum was applied and the flask temperature was raised slowly to 120° C and held at 120° C for 15 minutes. The flask was removed from the rotary evaporator and the contents were weighed. The weight of product was 459 parts, that is, 86 percent yield per cyclic trisiloxane. Silanol analysis showed the oil was a siloxanol of average chain length of six.

EXAMPLE 2

The procedure described in Example 1 was repeated with the exception that 500 parts of 1,3,5-trimethyl-1,3,5-trivinylcyclotrisiloxane was substituted for the hexamethylcyclotrisiloxane. The yield of product oil was 470 parts, that is, 88 percent per cyclic trisiloxane, and silanol analysis showed the diol had an average chain length of seven methylvinylsiloxy units.

EXAMPLE 3

Into a 1 liter, 3-neck flask was added 200 parts of acetone, 200 parts of 1,3,5-trimethyl-1,3,5tris(3,3,3trifluoropropyl)cyclotrisiloxane, 20 parts of water and 4 parts of Filtrol 20. The contents of the flask were mechanically agitated and brought to reflux temperature. After 4 hours of reflux, a 5 cc sample was taken from the flask and 0.7 parts of anhydrous MgSO$_4$ was added to the sample and the sample filtered. The filtrate was transferred to a watch glass which was then placed in a vacuum oven for 10 minutes at 100° C and 25 mm Hg. A drop of the oil was placed on a sodium chloride plate and an infrared spectrum taken. The spectrum showed a strong silanol adsorption but also showed a strong adsorption at 9.8 microns — a band characteristic of cyclic siloxane trimers. The reaction was continued with samples removed and tested as above at the end of 8 and 12 total hours of reflux. The sample at the end of 12 total hours indicated essentially no cyclic trimer remained in the reaction. The reaction was cooled to room temperature and 4 parts of diatomaceous earth was added to the reaction. The pot contents were filtered and the filter was washed with 25cc of acetone. The filtrate was transferred to a 500 cc flask in two successive portions with the solvent being removed on a rotary evaporator at 60° C and 40 mm Hg. The flask temperature was finally raised to 100° C and held there for 15 minutes. The product oil plus the oil isolated during the three sampling events weighed 189 parts, that is, 95 percent yield from the original cyclic trisiloxane. Proton magnetic resonance analysis of the final diol proved that the average chain length was 4.5 methyltrifluoropropylsiloxy units.

I claim:

1. A process for producing low molecular weight silanol end-stopped diorganopolysiloxane polymers comprising (a) contacting a cyclic trimer of the formula, $$(R_2SiO)_3$$

where R is selected from the class consisting of alkyl radicals, haloalkyl radicals and cycloalkyl radicals of one to eight carbon atoms, vinyl radicals, phenyl radicals and mixtures thereof with an acid-activated hydroaluminum silicate clay, in the presence of water and a polar solvent, and (b) separating the desired product.

2. The process of claim 1 in which the cyclic trimer, water and polar solvent are present in a uniform homogeneous phase.

3. The process of claim 1 wherein the polar solvent is selected from the class consisting of acetone, dioxane, and tetrahydrofuran.

4. The process of claim 1 wherein in step (a) there is present 0.1 to 10 parts of acid-activated hydroaluminum silicate clay per 100 parts of the trimer, 0.5 to 10 parts of the polar solvent per part of the trimer and 0.05 to 1 parts of water per part of the trimer.

5. The process of claim 1 wherein step (a) is carried out at a temperature in the range of 50°–80° C for a time period of 2 to 12 hours.

6. The process of claim 1 wherein the acidactivated hydroaluminum silicate is a sulfuric acid treated montomortillonate clay.

7. The process of claim 1 further comprising adding in step (b) 0.1 to 5 parts of MgO per part of the acid treated hydroaluminum silicate clay, stripping the polar solvent at a temperature in the range of 20°–60° C, and at a pressure of 100–200 mm of Hg pressure, filtering out the MgO and acid-activated hydroaluminum silicate clay and stripping off the low boiling siloxanes and water at a temperature in the range of 100°–140°C at a pressure of 10–100 mm of Hg so as to obtain the desired silanolstopped diorganopolysiloxane having an average of anywhere from three to 10 diorganosiloxy units.

8. The process of claim 1 further comprising in step (b) filtering out the acid-activated hydroaluminum silicate clay, stripping off the acetone at a temperature in the range of 20°–60° C at a pressure of 100–200 mm of Hg, stripping out the low boiling siloxanes and water at a temperature in the range of 100°–140° C at a pressure of 10–100 mm of Hg so as to obtain the desired silanolstopped diorganopolysiloxane having an average of anywhere from three to 10 diorganosiloxy units.

9. The process of claim 1 wherein R is selected from the class consisting of methyl, ethyl, vinyl and phenyl.

10. The process of claim 1 wherein R is selected from the class consisting of $CH_3-$, $CH_3CH_2-$, $CF_3CH_2CH_2-$ and mixtures thereof.

* * * * *